United States Patent
Burgos (10) Patent No.: US 9,837,926 B2
(45) Date of Patent: Dec. 5, 2017

(54) RECTIFIER FOR CONVERTING THREE-PHASE AC VOLTAGE TO 12-PULSE DC VOLTAGE

(71) Applicants: ABB Technology AG, Zurich (CH); Rolando Burgos, Blacksburg, VA (US)

(72) Inventor: Rolando Burgos, Blacksburg, VA (US)

(73) Assignee: ABB SCHWEIZ AG, Baden (CH)

(*) Notice: Subject to any disclaimer, the term of this patent is extended or adjusted under 35 U.S.C. 154(b) by 74 days.

(21) Appl. No.: 14/425,049

(22) PCT Filed: Sep. 5, 2013

(86) PCT No.: PCT/US2013/058138
§ 371 (c)(1),
(2) Date: Mar. 1, 2015

(87) PCT Pub. No.: WO2014/039606
PCT Pub. Date: Mar. 13, 2014

(65) Prior Publication Data
US 2015/0222200 A1      Aug. 6, 2015

Related U.S. Application Data

(60) Provisional application No. 61/697,035, filed on Sep. 5, 2012.

(51) Int. Cl.
*H02M 1/14* (2006.01)
*H02M 7/06* (2006.01)
*H02M 7/08* (2006.01)

(52) U.S. Cl.
CPC ............ *H02M 7/08* (2013.01); *H02M 1/14* (2013.01); *H02M 7/062* (2013.01); *H02M 7/066* (2013.01)

(58) Field of Classification Search
CPC .......... H02M 1/14; H02M 1/143; H02M 7/02; H02M 7/04; H02M 7/06; H02M 7/062;
(Continued)

(56) References Cited

U.S. PATENT DOCUMENTS 2,759,140 A    8/1956  Lewis
3,628,123 A    12/1971 Rosa et al.
(Continued)

FOREIGN PATENT DOCUMENTS

CN    1209683 A    3/1999
CN    1565075 A    1/2005
(Continued)

OTHER PUBLICATIONS

International Search Report in related application No. PCT/US13/058138 dated Mar. 26, 2014, pp. 11.
(Continued)

*Primary Examiner* — Jeffrey Gblende
*Assistant Examiner* — David A. Singh
(74) *Attorney, Agent, or Firm* — Cooper Legal Group, LLC (57) ABSTRACT

A rectifier is configured to convert a three-phase AC voltage to a 12-pulse DC voltage, drawing a 12-pulse AC current from a three-phase network. The rectifier may comprise a first interleaved phase-leg, a second interleaved phase-leg, and/or a third interleaved phase-leg. Respective interleaved phase-legs may comprise positive portions configured to conduct positive current from a transformer towards a load, and negative portions configured to conduct negative current from the load back to the transformer. The rectifier may be configured to sequentially cycle respective interleaved phase-legs into positive and/or negative 120 conducting states over a 360 degree cycle to output the 12-pulse DC voltage. For example, during a first 120 degree conducting
(Continued)

state a positive portion of the first interleaved phase-leg may conduct positive current towards the load, while a negative portion of a different phase-leg may conduct negative current back to the transformer.

20 Claims, 7 Drawing Sheets

(58) Field of Classification Search
CPC ...... H02M 7/064; H02M 7/066; H02M 7/068; H02M 7/08
USPC .................................. 363/13, 123, 125, 126
See application file for complete search history.

(56) References Cited

U.S. PATENT DOCUMENTS

| | | | |
|---|---|---|---|
| 3,974,397 A * | 8/1976 | Killough, Jr. ............ | H02J 9/06 307/43 |
| 4,208,709 A | 6/1980 | Garnham et al. | |
| 4,866,591 A | 9/1989 | Cook et al. | |
| 4,876,634 A | 10/1989 | Paice | |
| 5,124,904 A | 6/1992 | Paice | |
| 5,148,357 A | 9/1992 | Paice | |
| 5,169,407 A | 12/1992 | Mase et al. | |
| 5,455,759 A | 10/1995 | Paice | |
| 5,633,793 A * | 5/1997 | Lee ........................ | H02M 7/062 363/127 |
| 5,781,428 A | 7/1998 | Paice | |
| 6,038,151 A * | 3/2000 | Jiang .................. | H02M 1/4216 363/44 |
| 6,101,113 A | 8/2000 | Paice | |
| 6,191,968 B1 | 2/2001 | Paice | |
| 6,256,213 B1 * | 7/2001 | Illingworth ....... | H02M 3/33576 363/126 |
| 6,861,936 B2 | 3/2005 | Kamath | |
| 6,995,993 B2 | 2/2006 | Sarlioglu et al. | |
| 7,049,921 B2 | 5/2006 | Owen | |
| 7,274,280 B1 | 9/2007 | Paice | |

| | | | |
|---|---|---|---|
| 2005/0281068 A1* | 12/2005 | Strandberg ............ | H02M 7/797 363/132 |
| 2006/0109694 A1* | 5/2006 | Peng ................... | H02M 7/4826 363/37 |
| 2006/0187684 A1* | 8/2006 | Chandrasekaran | H02M 3/33592 363/16 |
| 2007/0086125 A1* | 4/2007 | Baker ..................... | H02M 7/06 361/42 |
| 2009/0122582 A1 | 5/2009 | Ye et al. | |

FOREIGN PATENT DOCUMENTS

| | | |
|---|---|---|
| CN | 1832319 A | 3/2006 |
| CN | 101540507 A | 9/2009 |
| EP | 1113570 A1 | 7/2001 |
| EP | 2254232 A1 | 11/2010 |
| JP | H0746846 A | 2/1995 |
| RU | 2005121360 A | 1/2007 |
| WO | 2011154258 A1 | 12/2011 |

OTHER PUBLICATIONS

"Rectifier circuits", pp. 1-7, Oct. 18, 2003, http://www.allaboutcircuits.com/vol_3/chpt_3/4.html.
A. Uan-Zo-li, R. Burgos, F. Wang, D. Boroyevich, F. Lacaux, and A. Tardy, "Comparison of prospective topologies for aircraft autotransformer-rectifier units," in Conf. Proceed. IEEE IECON '03, vol. 2, pp. 1122-1127, Nov. 2003. http://ieeexplore.ieee.org/cart/download.jsp?partnum=1280206&searchProductType=IEEE%20Conferences.
R. Burgos, A. Uan-Zo-li, F. Lacaux, F. Wang, and D. Boroyevich, "Analysis and experimental evaluation of symmetric and asymmetric 18-pulse autotransformer rectifier topologies," in Conf. Proceed. IEEE PCC '07 Nagoya, pp. 1286-1293, Apr. 2007.
"Rectifier", pp. 1, Jun. 25, 2004, http://en.wikipedia.org/wiki/Rectifier.
First Chinese Office Action in Chinese Application No. 2013800568850 dated Mar. 3, 2017, 10 pgs.
Russian Office Action cited in Russian Application No. 2015112234 dated Sep. 4, 2017, 3 pgs.

* cited by examiner

RECTIFIER FOR CONVERTING THREE-PHASE AC VOLTAGE TO 12-PULSE DC VOLTAGE

REFERENCE TO RELATED APPLICATION

This application claims priority to U.S. Provisional Application No. 61/697,035 entitled "INTERLEAVED 12-PULSE RECTIFIER", filed Sep. 5, 2012, at least some of which may be incorporated herein.

BACKGROUND

A rectifier is an electronic device that converts alternating current (AC) to direct current (DC). Because the alternating current periodically reverses direction (e.g., a sinusoidal waveform), the rectifier may output a type of DC current characterized by pulsating voltages and/or currents (e.g., an AC ripple voltage), as opposed to a pure DC output. In one example, a rectifier may utilize diodes to allow current to flow through the rectifier in one direction, while mitigating the flow of the current in an opposite direction. In this way, a rectifier may be used to drive a DC source, such as a motor, by converting power grid AC current (e.g., three-phase AC voltage) to pulse DC current (e.g., 12-pulse DC voltage).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques related to converting a three-phase AC voltage to a 12-pulse DC voltage are provided herein. A rectifier may be connected to a three-phase AC network (e.g., through a transformer to provide galvanic isolation). For example, the rectifier may be connected to a first set of phase voltages (e.g., a first high voltage and a first low voltage), a second set of phase voltages (e.g., a second high voltage and a second low voltage), and/or a third set of phase voltages (e.g., a third high voltage and a third low voltage) generated from the three-phase AC network by a transformer. In this way, the transformer may output 2 three-phase set of voltages to the rectifier (e.g., 3 high voltages and 3 low voltages for a total of 6 phase voltages, where respective high and low voltages are phase shifted by 60 degrees with respect to one another).

Figure 1:
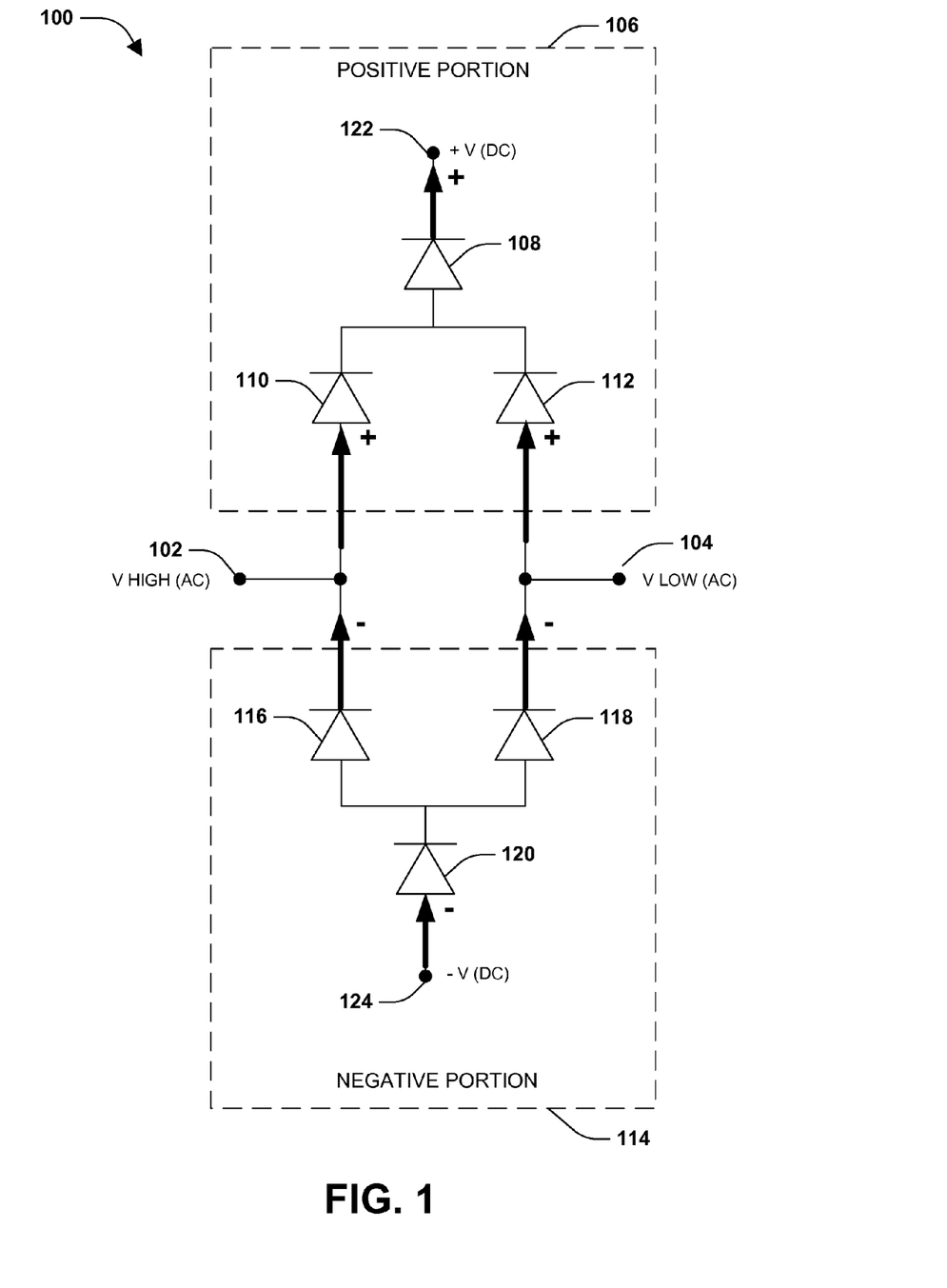
FIG. 1 is an illustration of an example of a first interleaved phase-leg of a rectifier.
Figure 2:
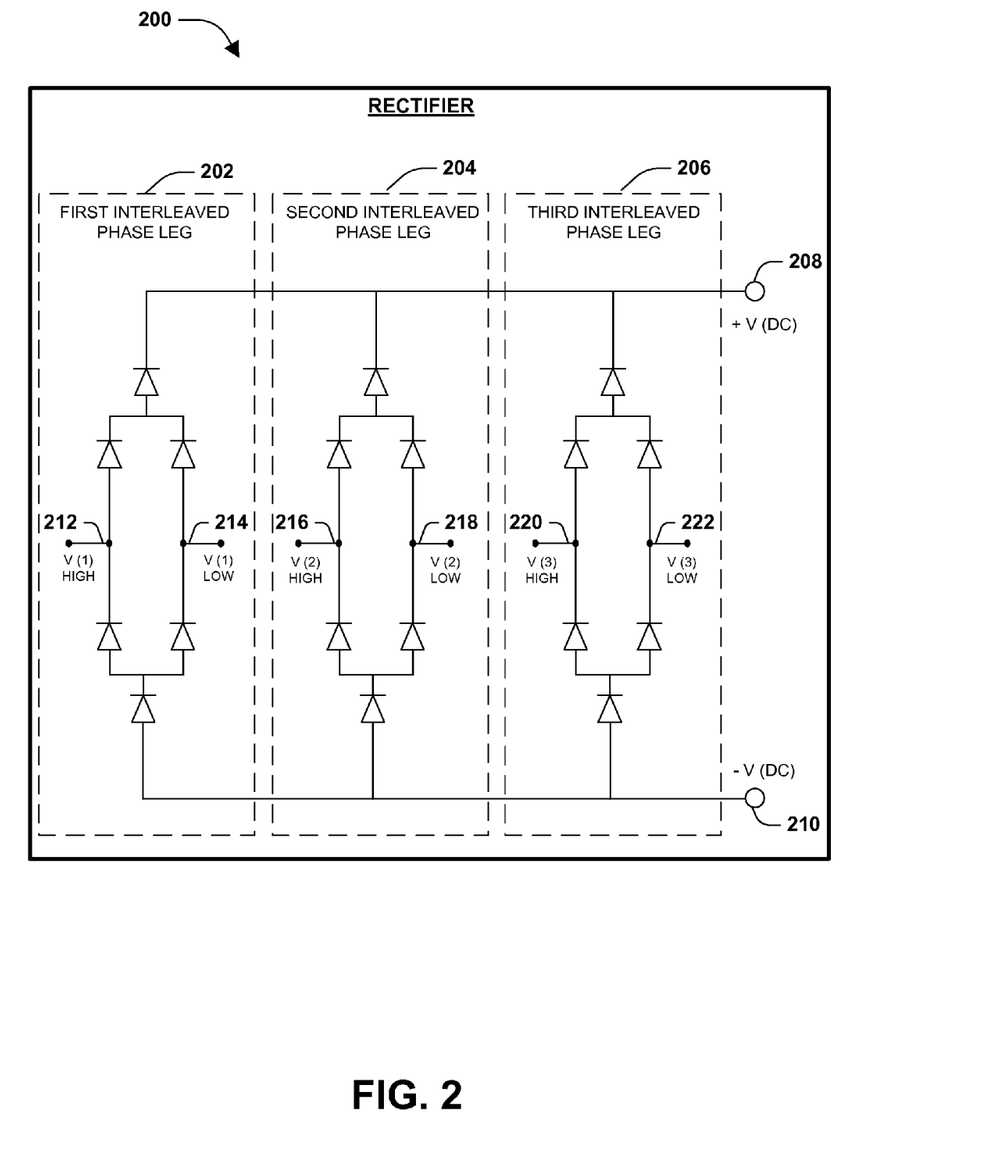
FIG. 2 is an illustration of an example of a rectifier comprising a first interleaved phase-leg, a second interleaved phase-leg, and a third interleaved phase-leg.

The rectifier comprises a first interleaved phase-leg (e.g., first interleaved phase-leg 100 of FIG. 1), a second interleaved phase-leg (e.g., second interleaved phase-leg 204 of FIG. 2), and a third interleaved phase-leg (e.g., third interleaved phase-leg 206 of FIG. 2). The first interleaved phase-leg may be connected to the first set of phase voltages. For example, a first positive diode may be connected to the first high voltage (e.g., a first positive diode 110 connected to a first high voltage 102 of FIG. 1) and/or a second positive diode may be connected to the first low voltage (e.g., a second positive diode 112 connected to a first low voltage 104 of FIG. 1). The first positive diode and/or the second positive diode may be connected to a positive main diode (e.g., positive main diode 108 of FIG. 1). The positive main diode may be connected to a positive DC voltage rail, which may be connected to a load (e.g., a DC motor). A first negative diode may be connected to the first high voltage (e.g., a first negative diode 116 of FIG. 1) and/or a second negative diode may be connected to the first low voltage (e.g., a second negative diode 118 of FIG. 1). A negative main diode (e.g., a negative main diode 120 of FIG. 1) may be connected to the first negative diode and/or the second negative diode. The negative main diode may be connected to a negative DC voltage rail, which may be connected to the load. In a similar manner, the second interleaved phase-leg may be connected to the second set of phase voltages and/or the third interleaved phase-leg may be connected to the third set of phase voltages.

The rectifier is configured to sequentially cycle respective interleaved phase-legs into a 120 degree conducting state over a 360 degree cycle to output a 12-pulse DC voltage. In one example, the first interleaved phase-leg may conduct positive current during a first 120 conducting state (e.g., the first positive diode conducts for 90 degrees and the second positive diode conducts for 30 degrees), the second interleaved phase-leg may conduct positive current during a second 120 conducting state, and/or the third interleaved phase-leg may conduct positive current during a third 120 conducting state. While an interleaved phase-leg is conducting positive current, a different interleaved phase-leg conducts negative current. For example, respective interleaved phase-legs may comprise a positive portion (e.g., positive portion 106 of the first interleaved phase-leg 110 of FIG. 1) configured to conduct positive current over a 120 degree conducting state and/or a negative portion (e.g., negative portion 114 of the first interleaved phase-leg 110 of FIG. 1) configured to conduct negative current over a 120 degree conducting state. In this way, a 12-pulse DC voltage may be output by the rectifier by sequentially cycling the respective interleaved phase-legs into a conducting state.

It may be appreciated that the systems and/or methods described herein are not limited to rectifiers comprising diodes, but also include rectifiers that utilize other reverse voltage blocking components, such as thyristors (e.g., SCR), reverse blocking gate-controlled switching devices, and/or other functionally equivalent combination of diodes and/or switching devices.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

As provided herein, a 12-pulse three-phase rectifier may be configured to convert a three-phase AC voltage to a 12-pulse rectified voltage waveform, which may be supplied to a DC load. The rectifier may comprise a first interleaved phase-leg, a second interleaved phase-leg, and a third interleaved phase-leg. The rectifier may be configured to sequentially cycle respective interleaved phase-legs into a 120 degree conducting state over a 360 degree cycle to output a 12-pulse DC voltage (e.g., which may be drawn as a 12-pulse like current). In this way, semiconductor devices (e.g., diodes, switches, thyristors, etc.) within the rectifier block phase voltages (e.g., instead of line-to-line voltages), which may mitigate reverse-voltage blocking ratings of such semiconductor devices (e.g., 42.3% lower voltage rating semiconductors may be utilized). In one example, merely 18 semiconductor devices may be utilized (e.g., 6 semiconductor devices per interleaved phase-leg) compared with 24 semiconductor devices utilized in conventional 12-pulse six-phase rectifiers requiring two series-connected diodes to effectively block a specified voltage.

Conventional rectifiers, such as a 12-pulse diode bridge, utilize 12 diodes with voltage ratings (e.g., blocking voltage ratings) rated at or very near 100% of a nominal blocking voltage determined by an output DC voltage, or utilize 24 diodes (e.g., two diodes connected in series per switch) with voltage ratings rated at or very near 50% of the nominal blocking voltage. Because the 12-pulse three-phase rectifier, provided herein, utilizes one or more phase-legs, the 12-pulse three-phase rectifier may be constructed with merely 18 diodes rated at or very near 50% of the nominal blocking voltage. In this way, material costs of the 12-pulse three-phase rectifier may be reduced by the use of relatively less expensive low-voltage diodes, for example.

FIG. 1 illustrates an example of a first interleaved phase-leg 100 of a rectifier. The rectifier, such as a 12-pulse three-phase rectifier, may comprise the first interleaved phase-leg 100, a second interleaved phase-leg (e.g., second interleaved phase-leg 204 of FIG. 2), and/or a third interleaved phase-leg (e.g., third interleaved phase-leg 206 of FIG. 3). The first interleaved phase-leg 100 may comprise a positive portion 106 configured to conduct positive current during a 120 degree conducting state. For example, the positive portion 106 may conduct positive current from a transformer, such as through a first connection to a first high voltage 102 and/or a second connection to a first low voltage 104 supplied by the transform, to a positive DC voltage rail 122. The first interleaved phase-leg 100 may comprise a negative portion 114 configured to conduct negative current during a 120 degree conducting state. For example, the negative portion 114 may conduct negative current from a negative DC voltage rail 124 back to the transformer, such as through the first connection to the first high voltage 102 and/or the second connection to the first low voltage 104.

The positive portion 106 of the first interleaved phase-leg 100 may comprise a first positive diode 110 connected to the first high voltage 102 and/or a second positive diode 112 connected to the first low voltage 104. In one example, the first low voltage 104 may lag behind the first high voltage by about 60 degrees (e.g., a 60 degree phase shift). In another example, the first low voltage 104 may comprise a magnitude that may be relatively smaller than a magnitude of the first high voltage 102 (e.g., about 26.8% lower magnitude). Because of the voltage magnitude difference and/or the phase shift, the first positive diode 110 may conduct for about 90 degrees (e.g., conduct positive current from the first high voltage 102 to a positive main diode 108 for 90 degrees) and the second positive diode 112 may conduct for about 30 degrees (e.g., conduct positive current from the first low voltage 104 to the positive main diode 108) during a 120 degree conducting state. The first positive diode 110 and the second positive diode 112 may be connected to the positive main diode 108. The positive main diode 108 may be configured to conduct for about 120 degrees (e.g., based upon 90 degrees of positive current conducted by the first positive diode 110 and/or 30 degrees of positive current conducted by the second positive diode 112). In this way, the positive main diode 108 may supply positive current to the positive DC voltage 122.

The negative portion 114 of the first interleaved phase-leg 100 may comprise a negative main diode 120 connected to a first negative diode 116 and/or a second negative diode 118. The first negative diode 116 may be connected to the first high voltage 102 and the second negative diode 118 may be connected to the first low voltage 104. The negative main diode 120 may be configured to conduct negative current (e.g., for about 120 degrees) from the negative DC voltage rail 124 to the first negative diode 116 and/or the second negative diode 118. The first negative diode 116 may be configured to conduct negative current from the negative main diode 120 to the first high voltage 102 for about 90 degrees (e.g., back to a transformer connected to the first high voltage 102). The second negative diode 118 may be configured to conduct negative current from the negative main diode 120 to the first low voltage for about 30 degrees (e.g., back to the transformer connect to the first low voltage 104).

In this way, the first interleaved phase-leg 100 of the rectifier may be configured to conduct for 120 degrees during a 360 degree cycle (e.g., conductive positive current during a positive portion of a 120 degree conducting state or conductive negative current during a negative portion of a 120 degree conducting state). The rectifier may sequentially cycle a second interleaved phase-leg and/or a third interleaved phase leave into a 120 degree conducting state, such that at least one of the first interleaved phase-leg 100, the second interleaved phase-leg, and/or the third interleaved phase-leg is conducting positive current, while a different interleaved phase-leg is conducting negative current. The rectifier may output a 12-pulse DC voltage and current based upon such a cycle.

FIG. 2 illustrates an example of a rectifier 200 comprising a first interleaved phase-leg 202, a second interleaved phase-leg 204, and/or a third interleaved phase-leg 206. The first interleaved phase-leg 202 may be connected to a first set of phase voltages comprising a first high voltage 212 and/or a first low voltage 214. The first low voltage 214 may comprise a magnitude that is relatively smaller than a magnitude of the first high voltage 212 (e.g., about 26.8% smaller in magnitude) and/or may comprise a phase that lags behind a phase of the first high voltage 212 (e.g., about a 60 degree phase shift). The second interleaved phase-leg 204 may be connected to a second set of phase voltages comprising a second high voltage 216 and/or a second low voltage 218. The second low voltage 218 may comprise a magnitude that is relatively smaller than a magnitude of the second high voltage 216 (e.g., about 26.8% smaller in magnitude) and/or may comprise a phase that lags behind a phase of the second high voltage 216 (e.g., about a 60 degree phase shift). The third interleaved phase-leg 206 may be connected to a third set of phase voltages comprising a third high voltage 220 and/or a third low voltage 222. The third low voltage 222 may comprise a magnitude that is relatively smaller than a magnitude of the third high voltage 220 (e.g., about 26.8% smaller in magnitude) and/or may comprise a phase that lags behind a phase of the third high voltage 220 (e.g., about a 60 degree phase shift).

In one example, the first set of phase voltages, the second set of phase voltages, and/or the third set of phase voltages may be associated with a three-phase voltage source. For example, a transformer, an autotransformer, and/or other types of devices may transform the three-phase voltage into two three-phase voltages to produce the first set of phase voltages, the second set of phase voltages, and/or the third set of phase voltages. In this way, the two three-phase voltages may comprise 3 high voltages and 3 low voltages for a total of 6 phase voltages, where respective high and low voltages are phase shifted by 60 degrees with respect to one another.

The rectifier 200 may be configured to sequentially cycle respective interleaved phase-legs into a 120 degree conducting state over a 360 degree cycle to output a 12-pulse DC voltage and current. For example, the first interleaved phase-leg 202 may conduct positive current from a source, such as a transformer, to a positive DC voltage rail 208 for a 120 degree conducting cycle (e.g., while the second interleaved phase-leg 204 and/or the third interleaved phase-leg 206 conduct negative current from a negative DC voltage rail 210 back to the source). Once completed, the second interleaved phase-leg 204 may conduct positive current from the source to the positive DC voltage rail 208 for a 120 degree conducting cycle (e.g., while the first interleaved phase-leg 202 and/or the third interleaved phase-leg 206 conduct negative current from the negative DC voltage rail 210 back to the source). Once complete, the third interleaved phase-leg 206 may conduct positive current from the source to the positive DC voltage rail 208 for a 120 degree conducting cycle (e.g., while the first interleaved phase-leg 202 and/or the second interleaved phase-leg 204 conduct negative current from the negative DC voltage rail 210 back to the source). It may be appreciated that respective interleaved phase-legs may be cycled into the 120 degree conducting state in any order and/or combination as determined by the instantaneous voltage magnitude of the 6 phase voltages.

Figure 3:
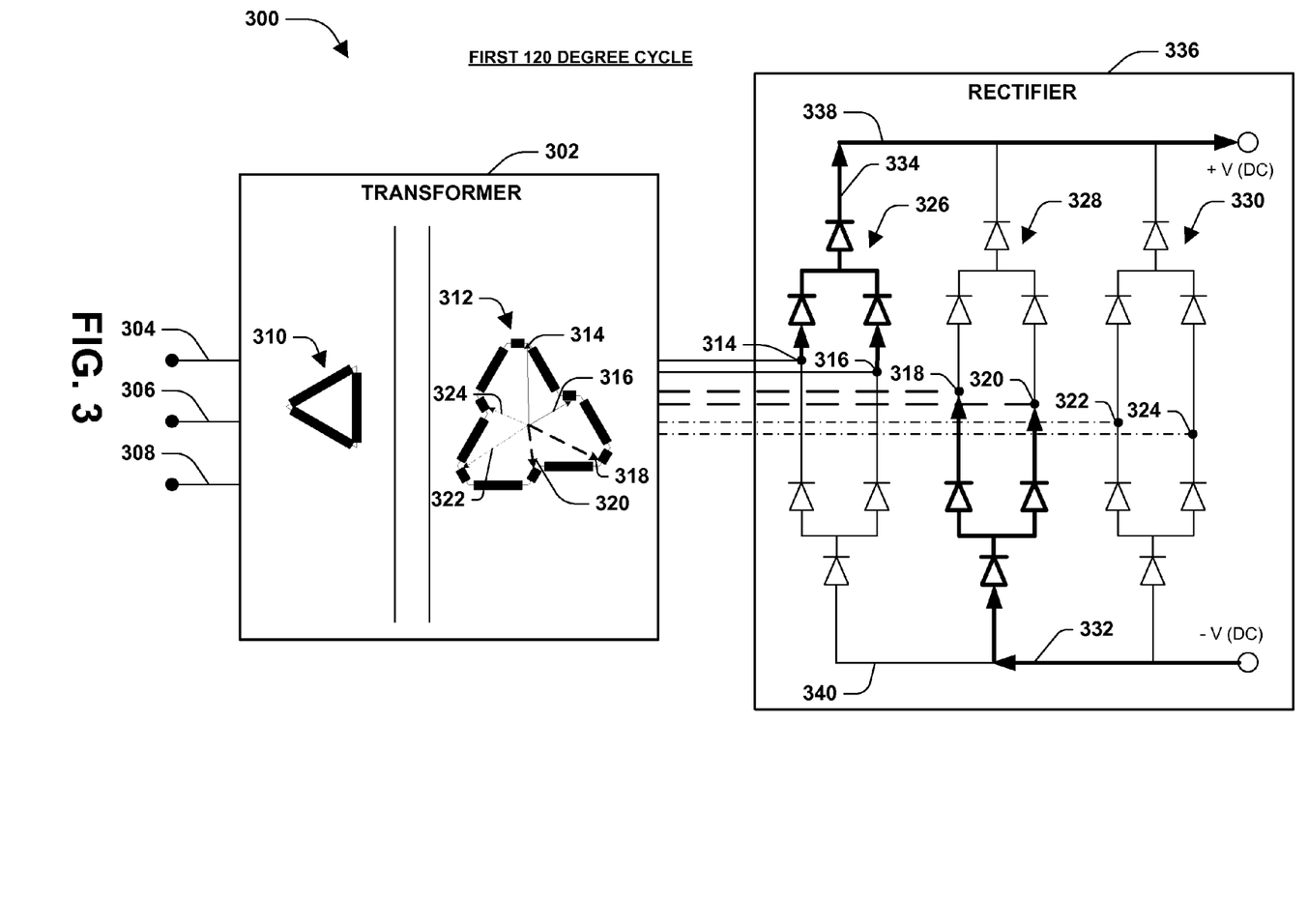
FIG. 3 is an illustration of an example of a first 120 degree cycle of a rectifier.

FIG. 3 illustrates an example 300 of a first 120 degree cycle of a rectifier 336. A transformer 302 may be configured to receive a three-phase voltage (e.g., a first phase 304, a second phase 306, and/or a third phase 308). The transformer may comprise a primary winding 310, such as a delta winding that may provide a 30 degree phase shift between the respective phases. The transformer 302 may comprise a secondary winding 312, such as a star connection that may generate 2 three-phase voltages (e.g., 3 high voltages and 3 low voltages), resulting in 6 phase voltages. For example, a first set of phase voltages may comprise a first high voltage 314 and a first low voltage 316 (e.g., with a phase shift of about 60 degrees and a magnitude difference of about 26.8%), a second set of phase voltages may comprise a second high voltage 318 and a second low voltage 320 (e.g., with a phase shift of about 60 degrees and a magnitude difference of about 26.8%), and/or a third set of phase voltages may comprise a third high voltage 322 and a third low voltage 324 (e.g., with a phase shift of about 60 degrees and a magnitude difference of about 26.8%). In one example, the transformer 302 may provide galvanic isolation from a source of the three-phase voltage.

The first high voltage 314 and the first low voltage 316 of the first set of phase voltages may be connected to a first interleaved phase-leg 326 of the rectifier 336 (e.g., through a first connection for the first high voltage 314 and a second connection for the first low voltage 316). The second high voltage 318 and the second low voltage 320 of the second set of phase voltages may be connected to a second interleaved phase-leg 328 of the rectifier 336 (e.g., through a third connection for the second high voltage 318 and a fourth connection for the second low voltage 320). The third high voltage 322 and the third low voltage 324 of the third set of phase voltages may be connected to a third interleaved phase-leg 330 of the rectifier 336 (e.g., through a fifth connection for the third high voltage 322 and a sixth connection for the third low voltage 324).

The rectifier 336 may be configured to sequentially cycle respective interleaved phase-legs into a 120 degree conducting state over a 360 degree cycle to output a 12-pulse DC voltage and current. In one example, during the first 120 degree cycle, the first interleaved phase-leg 326 may conduct positive current 334 from the transformer 302 (e.g., through the first connection of the first high voltage 314 and the second connection of the first low voltage 316) to a positive DC voltage rail 338 that may be connected to a load. A different interleaved phase-leg, such as the second interleaved phase-leg 328, may conduct negative current 332 from the load (e.g., through a negative DC voltage rail 340) back to the transformer 302 (e.g., through the third connection of the second high voltage 318 and the fourth connection of the second low voltage 320). In this way, the first interleaved phase-leg 326 may conduct positive current 334 and the second interleaved phase-leg 328 may conduct negative current 332 during the first 120 degree cycle.

Figure 4:
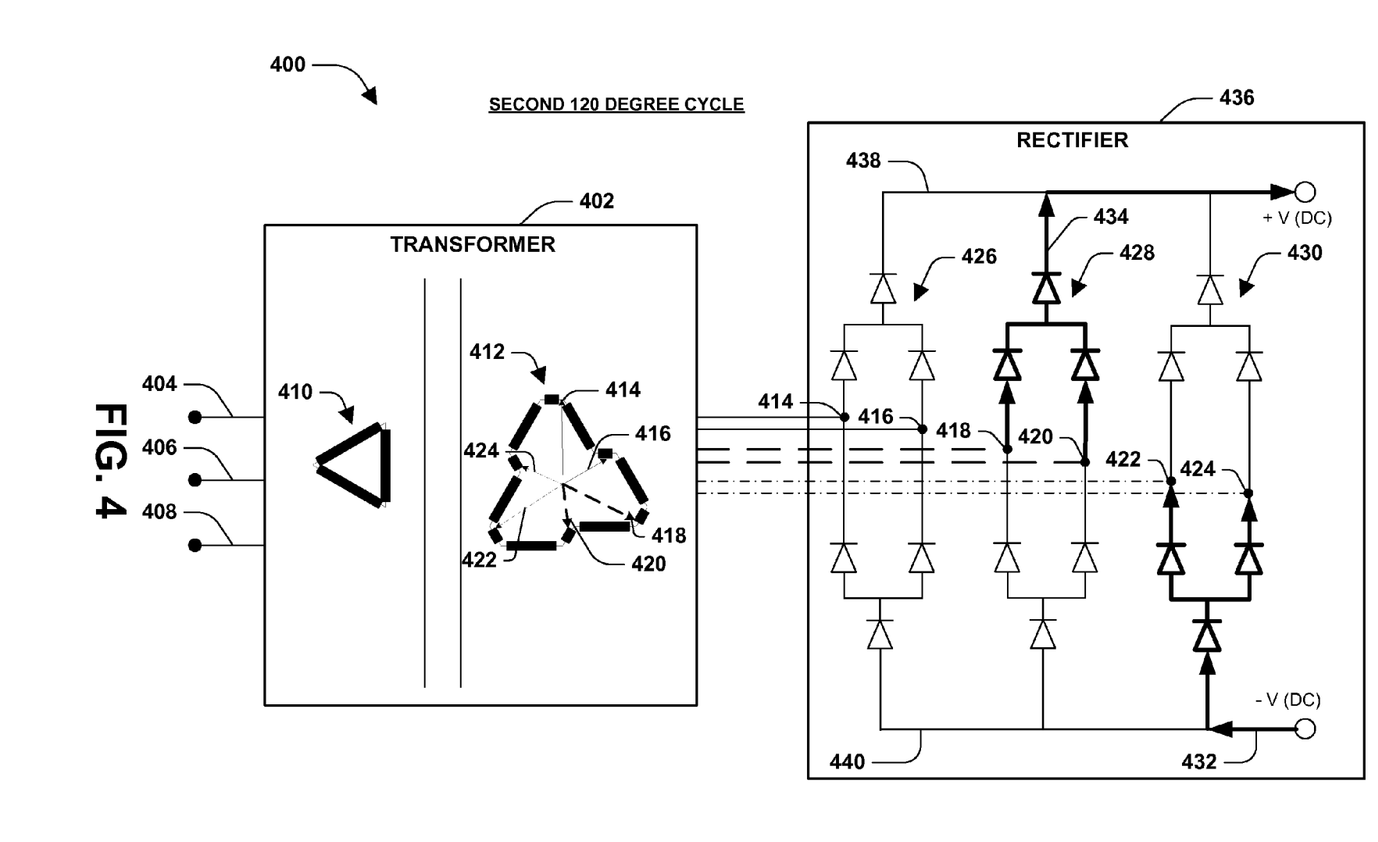
FIG. 4 is an illustration of an example of a second 120 degree cycle of a rectifier.

FIG. 4 illustrates an example 400 of a second 120 degree cycle of a rectifier 436. A transformer 402 may be configured to receive a three-phase voltage (e.g., a first phase 404, a second phase 406, and/or a third phase 408). The transformer 402 may comprise a primary winding 410, such as a delta winding that may provide a 30 degree phase shift between the respective phases. The transformer 402 may comprise a secondary winding 412, such as a star connection that may generate 2 three-phase voltages (e.g., 3 high voltages and 3 low voltages), resulting in 6 phase voltages. For example, a first set of phase voltages may comprise a first high voltage 414 and a first low voltage 416 (e.g., with a phase shift of about 60 degrees and a magnitude difference of about 26.8%), a second set of phase voltages may comprise a second high voltage 418 and a second low voltage 420 (e.g., with a phase shift of about 60 degrees and a magnitude difference of about 26.8%), and/or a third set of phase voltages may comprise a third high voltage 422 and a third low voltage 424 (e.g., with a phase shift of about 60 degrees and a magnitude difference of about 26.8%). In one example, the transformer 402 may provide galvanic isolation from a source of the three-phase voltage.

The first high voltage 414 and the first low voltage 416 of the first set of phase voltages may be connected to a first interleaved phase-leg 426 of the rectifier 436 (e.g., through a first connection for the first high voltage 414 and a second connection for the first low voltage 416). The second high voltage 418 and the second low voltage 420 of the second set of phase voltages may be connected to a second interleaved phase-leg 428 of the rectifier 436 (e.g., through a third connection for the second high voltage 418 and a fourth connection for the second low voltage 420). The third high voltage 422 and the third low voltage 424 of the third set of phase voltages may be connected to a third interleaved phase-leg 430 of the rectifier 436 (e.g., through a fifth connection for the third high voltage 422 and a sixth connection for the third low voltage 424).

The rectifier 436 may be configured to sequentially cycle respective interleaved phase-legs into a 120 degree conducting state over a 360 degree cycle to output a 12-pulse DC voltage and current. In one example, during the second 120 degree cycle, the second interleaved phase-leg 428 may conduct positive current 434 from the transformer 402 (e.g., through the third connection of the second high voltage 418 and the fourth connection of the second low voltage 420) to a positive DC voltage rail 438 that may be connected to a load. A different interleaved phase-leg, such as the third interleaved phase-leg 430, may conduct negative current 432 from the load (e.g., through a negative DC voltage rail 440) back to the transformer 402 (e.g., through the fifth connection of the third high voltage 422 and the sixth connection of the third low voltage 424). In this way, the second interleaved phase-leg 428 may conduct positive current 434 and the third interleaved phase-leg 430 may conduct negative 432 current during the second 120 degree cycle.

Figure 5:
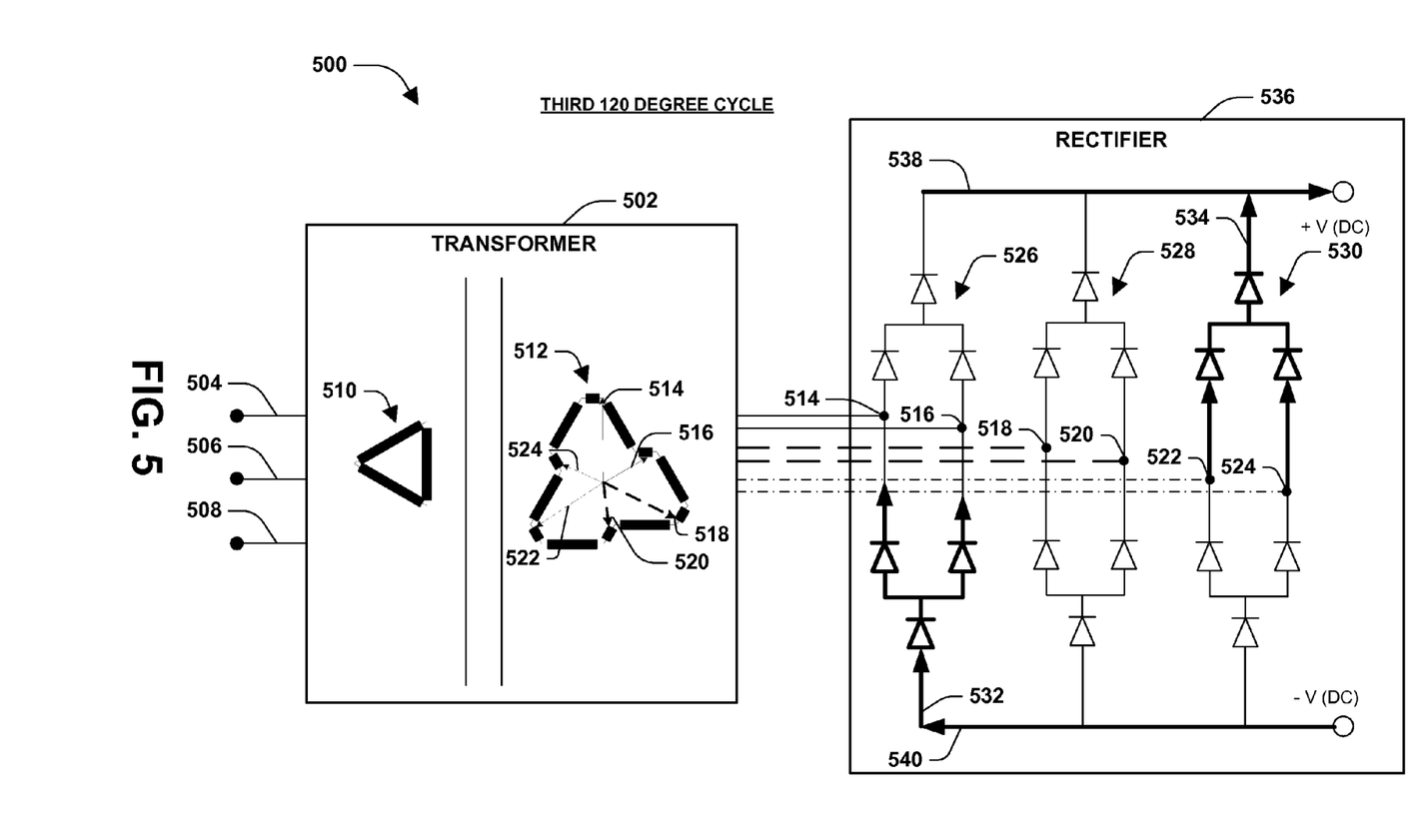
FIG. 5 is an illustration of an example of a third 120 degree cycle of a rectifier.

FIG. 5 illustrates an example 500 of a third 120 degree cycle of a rectifier 536. A transformer 502 may be configured to receive a three-phase voltage (e.g., a first phase 504, a second phase 506, and/or a third phase 508). The transformer may comprise a primary winding 510, such as a delta winding that may provide a 30 degree phase shift between the respective phases. The transformer 502 may comprise a secondary winding 512, such as a star connection that may generate 2 three-phase voltages (e.g., 3 high voltages and 3 low voltages), resulting in 6 phase voltages. For example, a first set of phase voltages may comprise a first high voltage 514 and a first low voltage 516 (e.g., with a phase shift of about 60 degrees and a magnitude difference of about 26.8%), a second set of phase voltages may comprise a second high voltage 518 and a second low voltage 520 (e.g., with a phase shift of about 60 degrees and a magnitude difference of about 26.8%), and/or a third set of phase voltages may comprise a third high voltage 522 and a third low voltage 524 (e.g., with a phase shift of about 60 degrees and a magnitude difference of about 26.8%). In one example, the transformer 502 may provide galvanic isolation from a source of the three-phase voltage.

The first high voltage 514 and the first low voltage 516 of the first set of phase voltages may be connected to a first interleaved phase-leg 526 of the rectifier 536 (e.g., through a first connection for the first high voltage 514 and a second connection for the first low voltage 516). The second high voltage 518 and the second low voltage 520 of the second set of phase voltages may be connected to a second interleaved phase-leg 528 of the rectifier 536 (e.g., through a third connection for the second high voltage 518 and a fourth connection for the second low voltage 520). The third high voltage 522 and the third low voltage 524 of the third set of phase voltages may be connected to a third interleaved phase-leg 530 of the rectifier 536 (e.g., through a fifth connection for the third high voltage 522 and a sixth connection for the third low voltage 524).

The rectifier 536 may be configured to sequentially cycle respective interleaved phase-legs into a 120 degree conducting state over a 360 degree cycle to output a 12-pulse DC voltage and current. In one example, during the third 120 degree cycle, the third interleaved phase-leg 530 may conduct positive current 534 from the transformer 502 (e.g., through the fifth connection of the third high voltage 522 and the sixth connection of the third low voltage 524) to a positive DC voltage rail 538 that may be connected to a load. A different interleaved phase-leg, such as the first interleaved phase-leg 526, may conduct negative current 532 from the load (e.g., through a negative DC voltage rail 540) back to the transformer 502 (e.g., through a first connection of the first high voltage 514 and a second connection of the first low voltage 516). In this way, the third interleaved phase-leg 530 may conduct positive current 534 and the first interleaved phase-leg 526 may conduct negative current 532 during the third 120 degree cycle.

Figure 6:
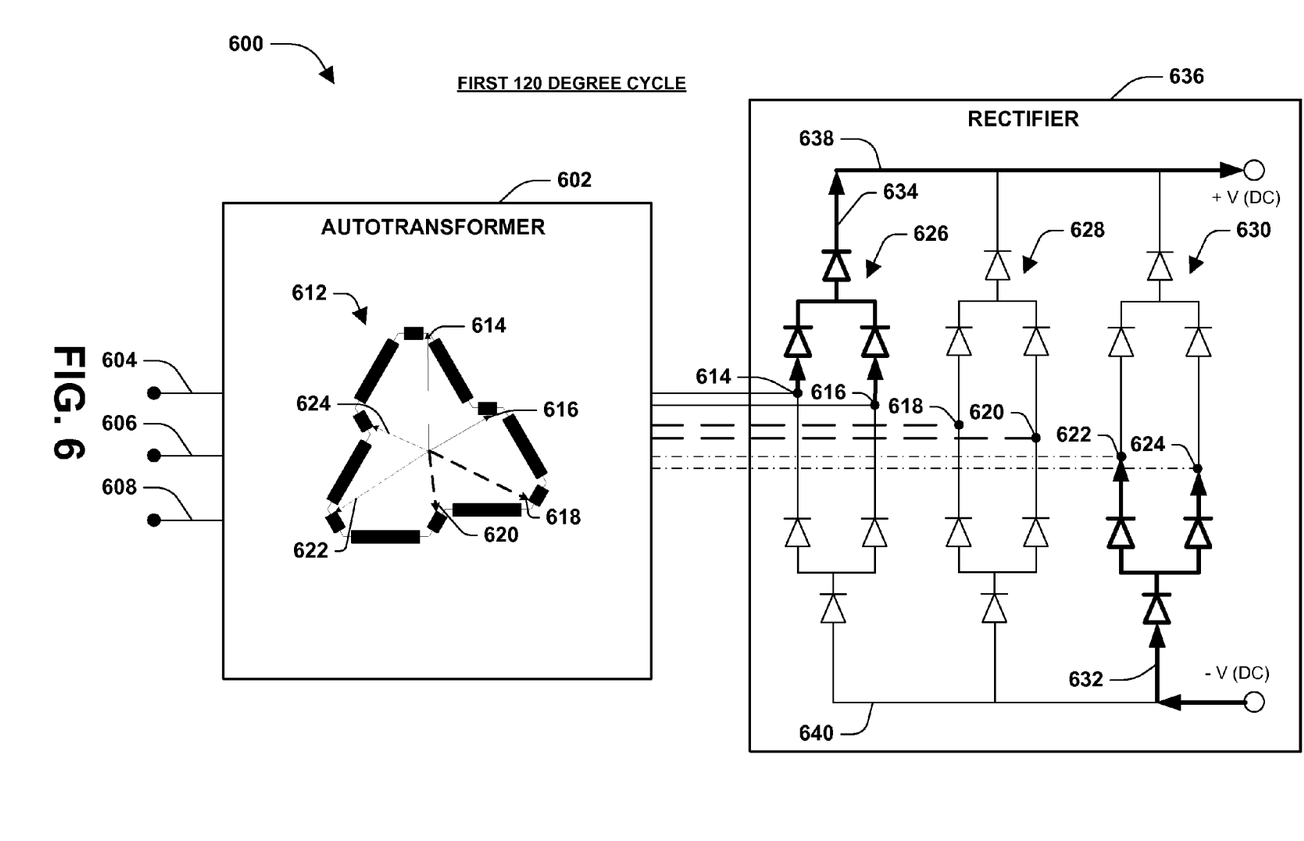
FIG. 6 is an illustration of an example of a first 120 degree cycle of a rectifier.

FIG. 6 illustrates an example 600 of a first 120 degree cycle of a rectifier 636. It may be appreciated that various transformer configurations (e.g., or no transformer) may be used to provide 2 three-phase voltages to the rectifier 636 (e.g., a transformer 302 of FIG. 3, an autotransformer 602, no transformer, and/or other configurations). It may also be appreciated that various combinations and/or orderings of interleaved phase-legs may be cycled over a 360 degree cycle (e.g., a first interleaved phase-leg 626 and a third interleaved phase-leg 630 may be configured to conduct during an exemplary first 120 degree cycle of FIG. 6, whereas a first interleaved phase-leg 326 and a second interleaved phase-leg 328 may be configured to conduct during an exemplary first 120 degree cycle of FIG. 3).

The autotransformer 602 may be configured to receive a three-phase voltage (e.g., a first phase 604, a second phase 606, and/or a third phase 608). The autotransformer 602 may comprise a winding 612, such as a star connection that may generate 2 three-phase voltages (e.g., 3 high voltages and 3 low voltages), resulting in 6 phase voltages. For example, a first set of phase voltages may comprise a first high voltage 614 and a first low voltage 616 (e.g., with a phase shift of about 60 degrees and a magnitude difference of about 26.8%), a second set of phase voltages may comprise a second high voltage 618 and a second low voltage 620 (e.g., with a phase shift of about 60 degrees and a magnitude difference of about 26.8%), and/or a third set of phase voltages may comprise a third high voltage 622 and a third low voltage 624 (e.g., with a phase shift of about 60 degrees and a magnitude difference of about 26.8%).

The first high voltage 614 and the first low voltage 616 of the first set of phase voltages may be connected to the first interleaved phase-leg 626 of the rectifier 636 (e.g., through a first connection for the first high voltage 614 and a second connection for the first low voltage 616). The second high voltage 618 and the second low voltage 620 of the second set of phase voltages may be connected to a second interleaved phase-leg 628 of the rectifier 636 (e.g., through a third connection for the second high voltage 618 and a fourth connection for the second low voltage 620). The third high voltage 622 and the third low voltage 624 of the third set of phase voltages may be connected to the third interleaved phase-leg 630 of the rectifier 636 (e.g., through a fifth connection for the third high voltage 622 and a sixth connection for the third low voltage 624).

The rectifier 636 may be configured to sequentially cycle respective interleaved phase-legs into a 120 degree conducting state over a 360 degree cycle to output a 12-pulse DC voltage and/or current. In one example, during the first 120 degree cycle, the first interleaved phase-leg 626 may conduct positive current 634 from the transformer 602 (e.g., through the first connection of the first high voltage 614 and the second connection of the first low voltage 616) to a positive DC voltage rail 638 that may be connected to a load. A different interleaved phase-leg, such as the third interleaved phase-leg 630, may conduct negative current 632 from the load (e.g., through the negative DC voltage rail 640) back to the transformer 602 (e.g., through a fifth connection of the third high voltage 622 and a sixth connection of the third low voltage 624). In this way, the first interleaved phase-leg 626 may conduct positive current 634 and the third interleaved phase-leg 630 may conduct negative current 632 during the first 120 degree cycle.

Figure 7:
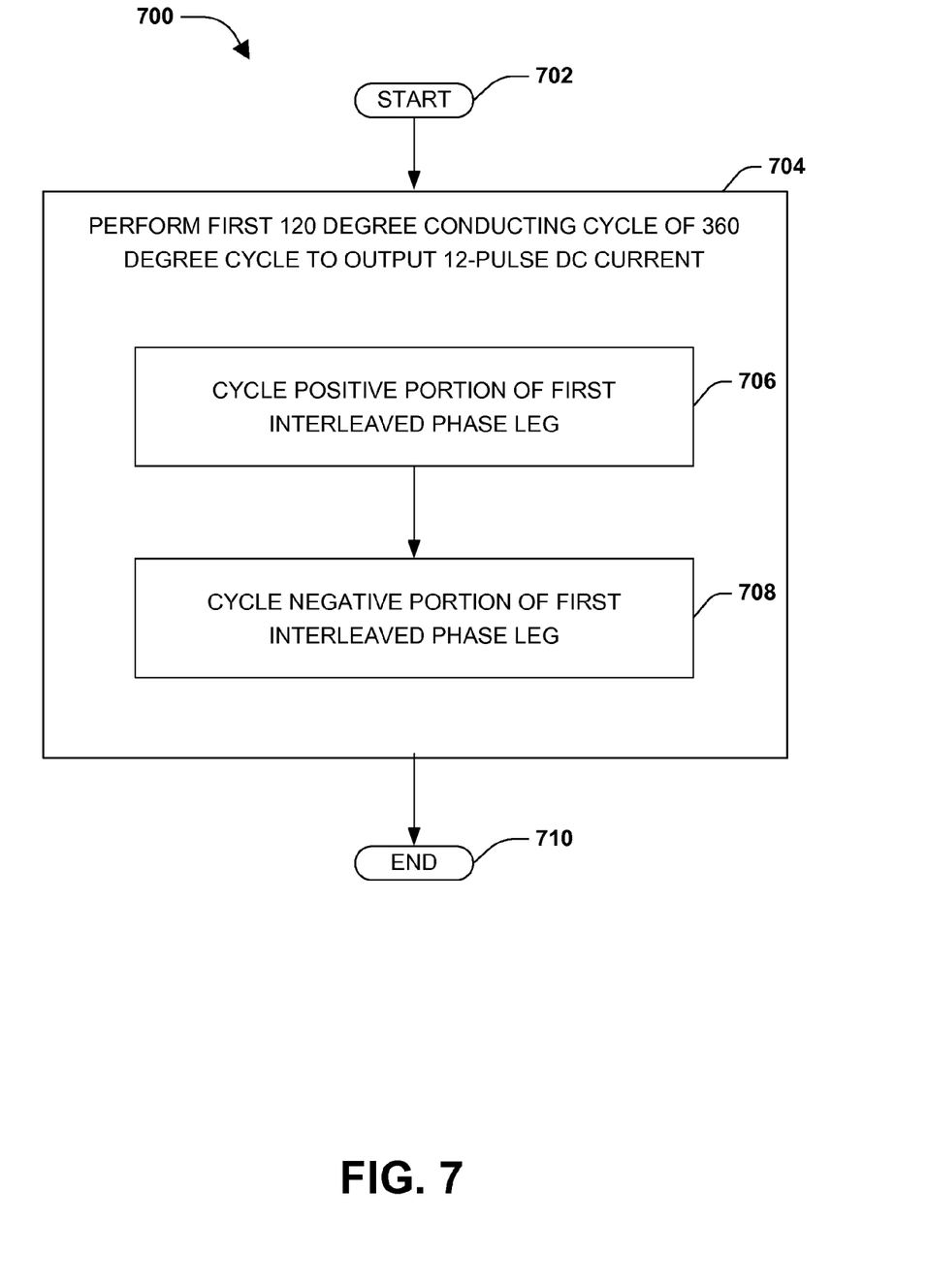
FIG. 7 is a flow diagram illustrating an exemplary method of converting a three-phase AC voltage to a 12-pulse DC voltage.

One embodiment of converting a three-phase AC voltage to a 12-pulse DC voltage is illustrated by an exemplary method 700 in FIG. 7. At 702, the method starts. At 704, a first 120 degree conducting cycle of a 360 degree cycle may be performed to output a 12-pulse DC voltage and/or current from a rectifier to a load based upon a three-phase AC input (e.g., supplied through a transformer). During the first 120 degree conducting cycle, a positive portion of a first interleaved phase-leg of the rectifier may be cycled into a positive 120 degree conducting state, at 706. Positive current may be conducted for about 90 degrees of the positive 120 degree conductive state by a first positive diode of the first interleaved phase and may be conducted for about 30 degrees by a second positive diode of the first interleaved phase. In particular, the first positive diode may conduct positive current from a first high voltage (e.g., provided by a transformer through a first connection) towards the load. The second positive diode may conduct positive current from a first low voltage (e.g., provided by the transformer through a second connection) towards the load. In one example, the positive current conducted by the first positive diode and the second positive diode may be conducted through a positive main diode of the first interleaved phase-leg during the positive 120 degree conducting state. In this way, the positive main diode may conduct the positive current to a positive DC voltage rail connected to the load.

During the first 120 degree conducting cycle, a negative portion of a second interleaved phase-leg of the rectifier (e.g., an interleaved phase-leg different than the first interleaved phase-leg) may be cycled into a negative 120 degree conducting state, at 708. In particular, negative current may be conducted from the load (e.g., through a negative DC voltage rail connected to the load), through a negative main diode of a negative portion of the second interleaved phase-leg, towards a first negative diode and/or a second negative diode of the second interleaved phase-leg during the negative 120 degree conducting state. The first negative diode may conduct negative current from the negative main diode towards a second high voltage (e.g., connected to the transformer by a third connection) for about 90 degrees of the negative 120 degree conducting state. The second negative diode may conduct negative current from the negative main diode towards a second low voltage (e.g., connected to the transformer by a fourth connection) for about 30 degrees of the negative 120 degree conducting state. In this way, the first interleaved phase-leg may conduct positive current and the second interleaved phase-leg may conduct negative current during the first 120 degree conducting cycle.

The first interleaved phase-leg, the second interleaved phase-leg, and a third interleaved phase-leg of the rectifier may be sequentially cycled into positive and/or negative 120 conducting states over the 360 degree cycle to output the 12-pulse DC voltage and/or current. In one example of a second 120 degree conducting cycle, positive current may be conducted through the second interleaved phase-leg, while negative current may be conducted through the first interleaved phase-leg or the third interleaved phase-leg. In one example of a third 120 degree conducting cycle, positive current may be conducted through the third interleaved phase-leg, while negative current may be conducted through the first interleaved phase-leg or the second interleaved phase-leg. In this way, the rectifier may output a 12-pulse DC voltage and/or current. At 710, the method ends.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the arrangements/orders of the acts illustrated in FIG. 7 are merely examples, and some acts may be performed concurrently, some acts may be independent of other acts and/or some acts may be optional such that a method may be performed without one or more acts.

As used in herein "or" is intended to mean an inclusive "or" rather than an exclusive "or". In addition, "a" and "an" as used herein may generally be construed to mean "one or more" unless specified otherwise or clear from context to be directed to a singular form. Also, at least one of A and B and/or the like generally means A or B or both A and B.

Also, although the application has been shown and described with respect to one or more implementations, equivalent alterations and modifications will occur to others of ordinary skill in the art based upon a reading and understanding of this specification and the annexed drawings. The application includes all such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function. In addition, while a particular feature of the application may have been disclosed with respect to only one of several implementations, such feature may be combined with one or more other features of the other implementations as may be desired and/or advantageous for any given or particular application. Furthermore, to the extent that "includes", "having", "has", "with" and/or the like are used herein, such terms are intended to be inclusive in a manner similar to "comprising."

What is claimed is:

1. A system for converting a three-phase AC voltage to a 12-pulse DC voltage, comprising:

a transformer configured to convert a three-phase AC voltage into a first set of phase voltages, a second set of phase voltages, and a third set of phase voltages; and a rectifier comprising a first phase-leg electrically coupled to the first set of phase voltages, a second phase-leg electrically coupled to the second set of phase voltages, and a third phase-leg electrically coupled to the third set of phase voltages, the rectifier configured to sequentially cycle respective phase-legs into 120 degree conducting states over a 360 degree cycle to output a 12-pulse DC voltage, wherein each of the phase legs comprise:

a positive portion comprising a first positive diode, a second positive diode, and a main positive diode configured to conduct current towards a load, wherein an output of the first positive diode and an output of the second positive diode are electrically coupled to an input of the main positive diode; and a negative portion comprising a first negative diode, a second negative diode, and a main negative diode configured to conduct negative current from the load, wherein an output of the main negative diode is electrically coupled to an input of the first negative diode and an input of the second negative diode, wherein a positive portion of a phase-leg is configured to conduct towards the load while a negative portion of a different phase leg is conducting from the load during a 120 degree conducting state.

2. The system of claim 1, the first positive diode associated with a first high voltage of the first set of phase voltages and the second positive diode associated with a first low voltage of the first set of phase voltages.

3. The system of claim 2, the first high voltage comprising a high magnitude that is greater than a low magnitude of the first low voltage, and the first low voltage comprising a first phase that is 60 degrees shifted from a second phase of the first high voltage.

4. The system of claim 1, the main positive diode configured to conduct current from the first positive diode and the second positive diode towards the load.

5. The system of claim 1, the main negative diode configured to conduct current from the load towards the first negative diode and the second negative diode.

6. The system of claim 1, the first negative diode associated with a first high voltage of the first set of phase voltages and the second negative diode associated with a first low voltage of the first set of phase voltages.

7. The system of claim 1, the transformer configured to:
output six phase voltages, shifted by 60 degrees with respect to one another, to the rectifier.

8. The system of claim 1, the rectifier configured to:
perform a first 120 degree conducting state where a positive portion of the first phase-leg conducts towards the load while a negative portion of the second phase-leg or the third phase-leg conducts from the load;
perform a second 120 degree conducting state where a positive portion of the second phase-leg conducts towards the load while a negative portion of the first phase-leg or the third phase-leg conducts from the load; and
perform a third 120 degree conducting state where a positive portion of the third phase-leg conducts towards the load while a negative portion of the first phase-leg or the second phase-leg conducts from the load.

9. The system of claim 1, the second phase-leg comprising a second positive portion and a second negative portion, the second positive portion comprising a third positive diode, a fourth positive diode, and a second main positive diode, the second negative portion comprising a third negative diode, a fourth negative diode, and a second main negative diode.

10. The system of claim 9, the third phase-leg comprising a third positive portion and a third negative portion, the third positive portion comprising a fifth positive diode, a sixth positive diode, and a third main positive diode, the third negative portion comprising a fifth negative diode, a sixth negative diode, and a third main negative diode.

11. The system of claim 1, the rectifier configured to conduct current from the transformer, through the positive portion, to a positive DC voltage rail during a positive 120 degree conducting state.

12. A method for converting a three-phase AC voltage to a 12-pulse DC voltage, comprising:
performing a 360 degree cycle to output a 12-pulse DC voltage from a rectifier to a load based upon a three-phase AC input, wherein the rectifier comprises a first phase-leg electrically coupled to a first set of phase voltages, a second phase-leg electrically coupled to a second set of phase voltages, and a third phase-leg electrically coupled to a third set of phase voltages, wherein each of the phase legs comprise:
a positive portion comprising a first positive diode, a second positive diode, and a main positive diode configured to conduct current towards the load, wherein an output of the first positive diode and an output of the second positive diode are electrically coupled to an input of the main positive diode; and
a negative portion comprising a first negative diode, a second negative diode, and a main negative diode configured to conduct current from the load, wherein an output of the main negative diode is electrically coupled to an input of the first negative diode and an input of the second negative diode, wherein the performing the 360 degree cycle comprises:
performing a first 120 degree conducting state where a positive portion of the first phase-leg conducts towards the load while a negative portion of the second phase-leg or the third phase-leg conducts from the load;
performing a second 120 degree conducting state where a positive portion of the second phase-leg conducts towards the load while a negative portion of the first phase-leg or the third phase-leg conducts from the load; and
performing a third 120 degree conducting state where a positive portion of the third phase-leg conducts towards the load while a negative portion of the first phase-leg or the second phase-leg conducts from the load.

13. The method of claim 12, comprising:
sequentially cycling the first phase-leg, the second phase-leg, and the third phase-leg through 120 degree conducting states.

14. The method of claim 12, comprising:
conducting current, through the main positive diode, from the first positive diode and the second positive diode towards the load.

15. The method of claim 12, comprising:
conducting current from a transformer, through the positive portion, to a positive DC voltage rail during a positive 120 degree conducting state.

16. The method of claim 12, comprising:
outputting, from a transformer, six phase voltages, shifted by 60 degrees with respect to one another, to the rectifier.

17. The method of claim 12, comprising:
sequentially cycling the first phase-leg, the second phase-leg, and a third phase-leg of the rectifier into 120 degree conducting states over the 360 degree cycle to output the 12-pulse DC voltage.

18. The method of claim 12, wherein the performing a first 120 degree conducting state comprises:

conducting current from the load using a negative portion of the second phase-leg and not negative portions of the first phase-leg and the second phase-leg.

19. The method of claim 18, wherein the performing a first 120 degree conducting state comprises:
conducting current through the positive portion of the first phase-leg and not positive portions of the second phase-leg and the third phase-leg.

20. A system for converting a three-phase AC voltage to a 12-pulse DC voltage, comprising:
a rectifier comprising a first phase-leg electrically coupled to a first set of phase voltages, a second phase-leg electrically coupled to a second set of phase voltages, and a third phase-leg electrically coupled to a third set of phase voltages, the rectifier configured to sequentially cycle respective phase-legs over a 360 degree cycle to output a 12-pulse DC voltage, wherein each of the phase legs comprise:
a positive portion comprising a first positive diode, a second positive diode, and a main positive diode configured to conduct current towards a load, wherein an output of the first positive diode and an output of the second positive diode are electrically coupled to an input of the main positive diode; and
a negative portion comprising a first negative diode, a second negative diode, and a main negative diode configured to conduct current from the load, wherein an output of the main negative diode is electrically coupled to an input of the first negative diode and an input of the second negative diode, wherein during the 360 degree cycle the rectifier is configured to:
perform a first 120 degree conducting state where a positive portion of the first phase-leg conducts towards the load while a negative portion of the second phase-leg or the third phase-leg conducts from the load;
perform a second 120 degree conducting state where a positive portion of the second phase-leg conducts towards the load while a negative portion of the first phase-leg or the third phase-leg conducts from the load; and
perform a third 120 degree conducting state where a positive portion of the third phase-leg conducts towards the load while a negative portion of the first phase-leg or the second phase-leg conducts from the load.

* * * * *